Sept. 30, 1958     R. B. COTTON     2,854,201
AIRCRAFT BARRIER
Filed June 11, 1954     4 Sheets-Sheet 1
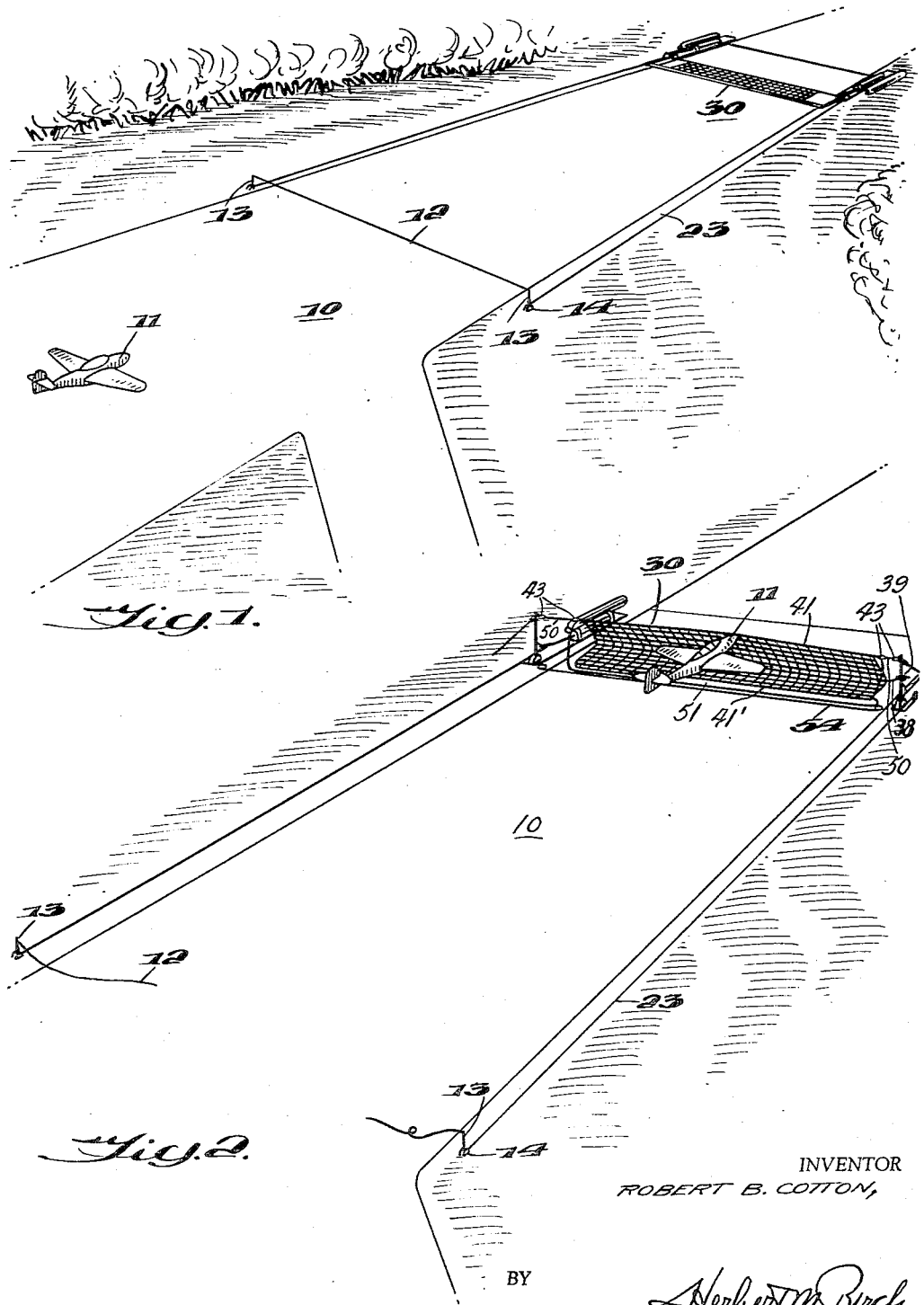
INVENTOR
ROBERT B. COTTON,
BY
*Herbert M. Birch*
ATTORNEY

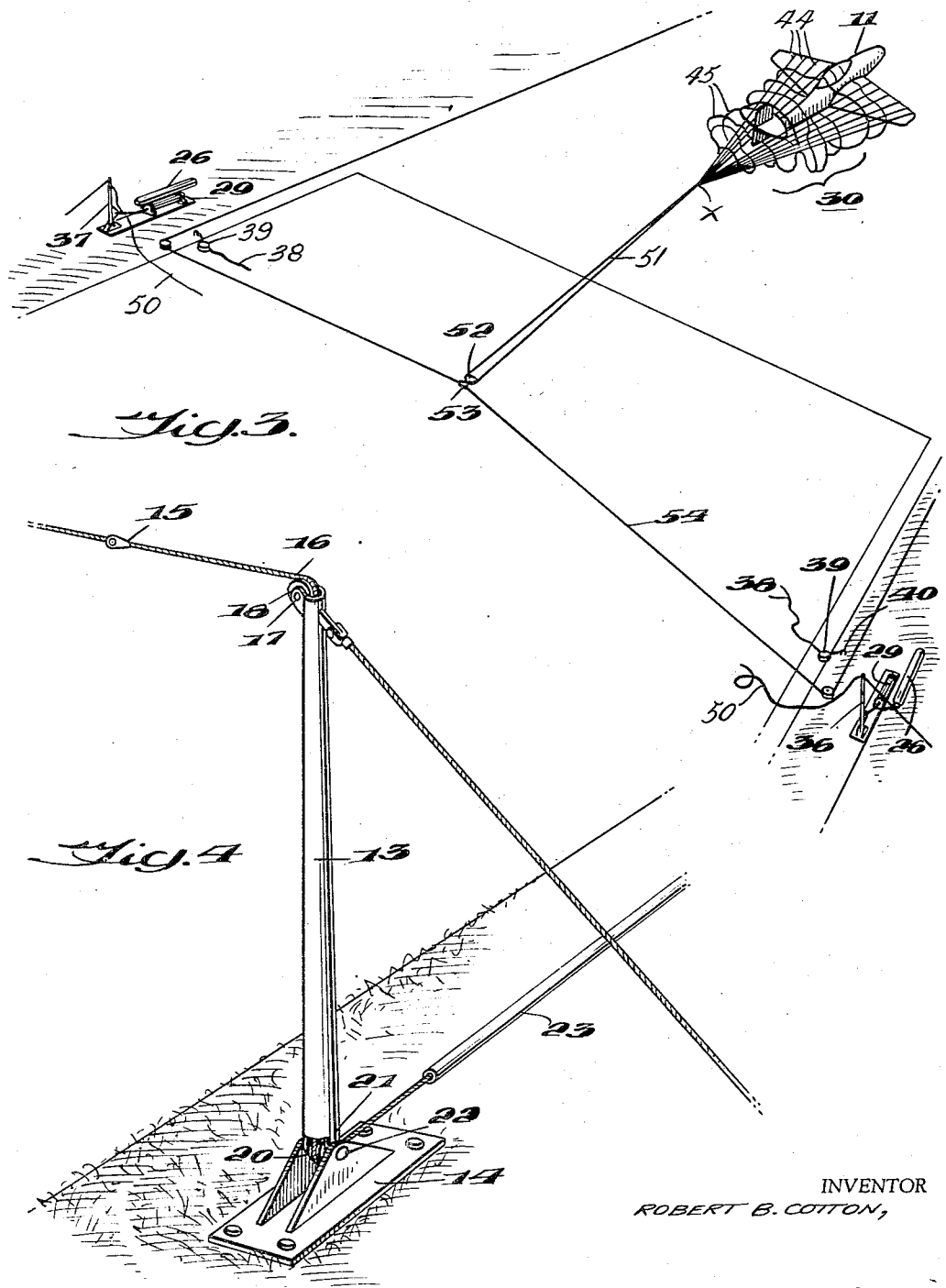

Sept. 30, 1958 R. B. COTTON 2,854,201
AIRCRAFT BARRIER
Filed June 11, 1954 4 Sheets-Sheet 3
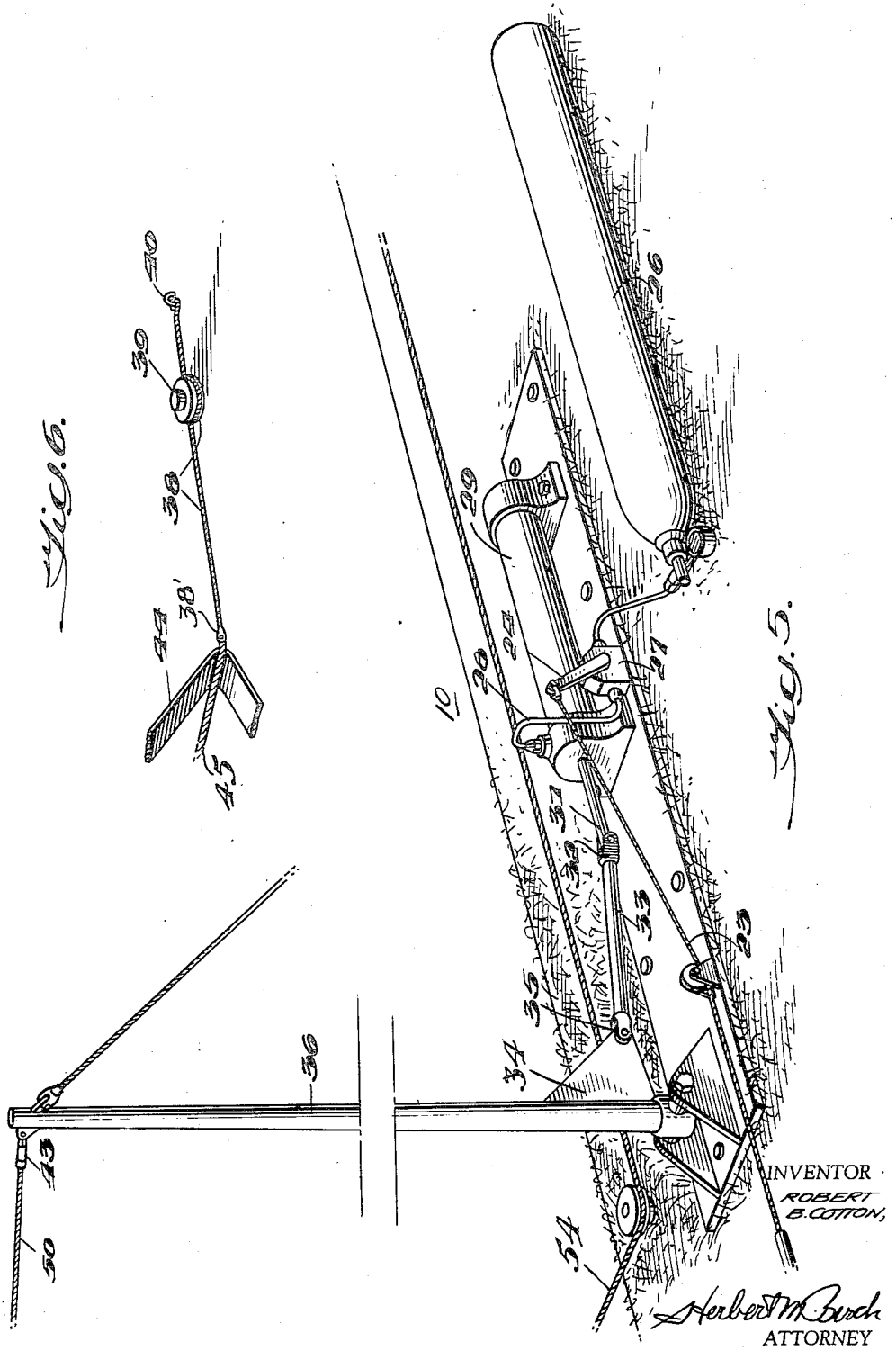
INVENTOR
ROBERT B. COTTON,
Herbert M. Birch
ATTORNEY

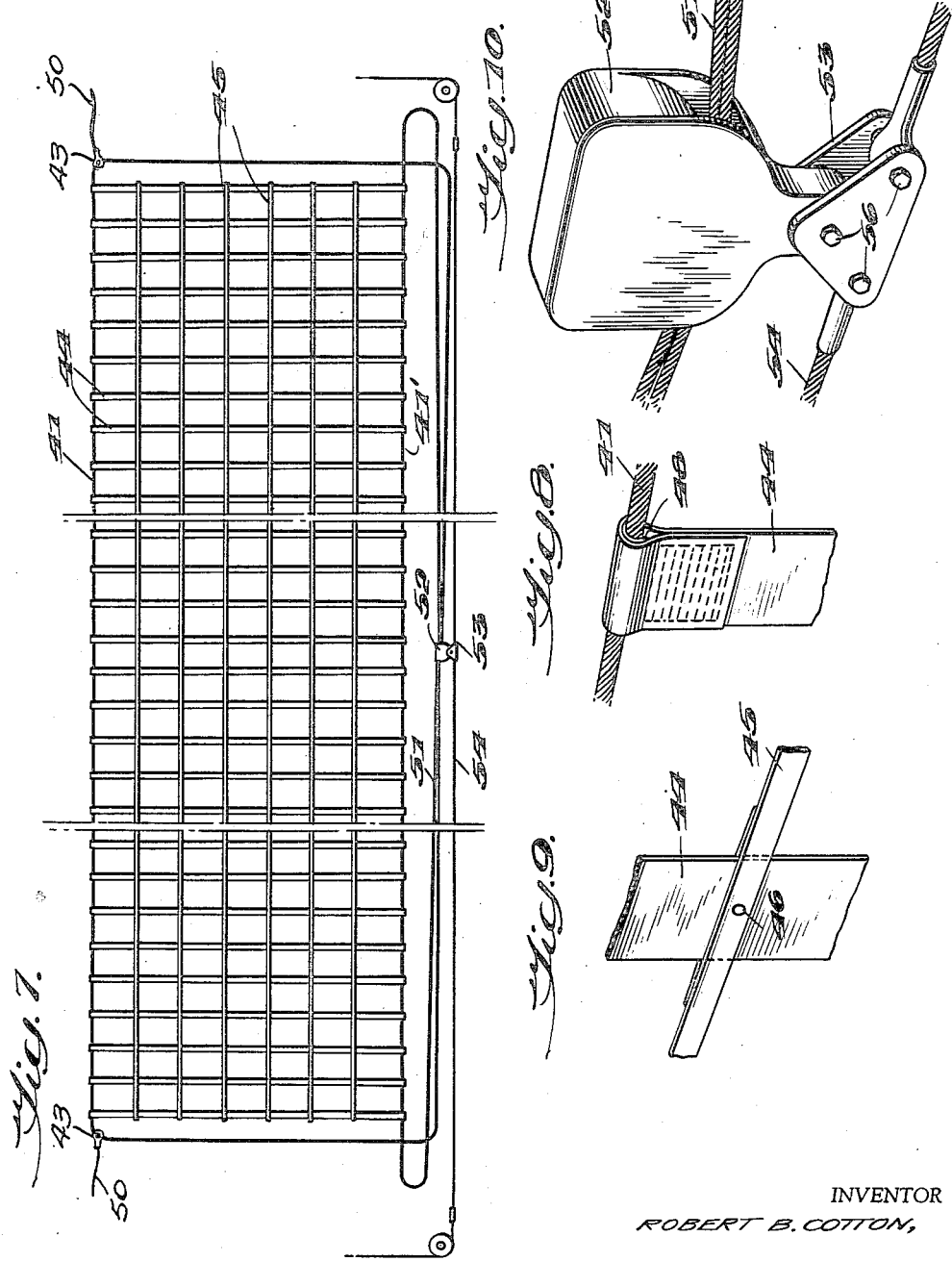

United States Patent Office 2,854,201
Patented Sept. 30, 1958

2,854,201

AIRCRAFT BARRIER

Robert B. Cotton, Media, Pa., assignor to All American Engineering Company, Wilmington, Del., a corporation of Delaware Application June 11, 1954, Serial No. 436,027

8 Claims. (Cl. 244—110)

The present invention relates to an aircraft barrier.

It is an object of the present invention to provide in combination with an arresting gear or energy absorbing device, a barrier adapted to efficiently perform when engaged at speeds greater than heretofore considered practicable, whereby all slack in the barrier members is taken up before the arresting gear or absorbing device starts to move, thereby taking advantage of the span effect of the arresting gear or energy absorbing device cable.

For example, if a high speed moving object contacts another mass, such as an arresting gear having a span of cable, without means of building up the speed of the moving mass of the arresting gear slowly, large cable loads approaching an infinite value would result, causing failure of the arresting gear or the airplane. By contacting the cable at right angles and pulling gradually from the deck sheaves of an arresting gear, the acceleration of the moving mass is held to a minimum. This is to be known and referred to as span effect by reference to the span of the cable between the sheaves on each side of the sheaves on each side of the deck or runway.

Another object of the present invention is to provide a novel barrier construction adapted to enclose an aircraft in a bag-like manner prior to final arrest action of the aircraft by additional arresting means.

Another object is to provide an aircraft shape conforming barrier which, after engagement, is adapted to provide equalization of the decelerating load to all the barrier members.

Another object is to provide a novel barrier with barrier members such as vertical load-carrying stringers formed of shock absorbing material, such as nylon webbing looped at each end around one of a pair of spaced horizontal marginal support and guide cables, to thereby permit said stringers to assume an equalized position over and around an engaged aircraft.

Still another object is to provide a novel barrier unit including barrier members, such as a plurality of load equalized stringers and load released position retaining means for holding said load equalizer stringers in position until the deceleration load is applied to the aircraft by the barrier means.

Yet another object of the invention is to provide a novel supporting arrangement for an aircraft barrier, whereby the barrier is slanted forward to a predetermined angle, whereby the upper part of the barrier falls rearwardly of the aircraft engaged thereby, to prevent possible injury to the pilot.

Another object is to provide novel actuator means in combination with the barrier for raising the same from a prone level position on a deck or runway to an erect or elevated barrier position with respect to the runway.

With the above and other objects in view, the invention consists in the construction, arrangement and combination of elements hereinafter described and particularly defined in the claims, it being expressly understood that the details of construction illustrated in the drawings are for the purposes of illustration and are not intended as limitations.

In the drawings, wherein like reference characters refer to like parts throughout the several views, Figure 1 is a schematic view showing an aircraft landing surface, an aircraft landing thereon approaching a deck prone barrier, and an actuator means in the path of the aircraft for erecting the barrier into aircraft engaging position.

Figure 2 is a view similar to Figure 1 showing the barrier erect and in the process of bagging or enclosing the aircraft.

Figure 3 is a schematic illustration of the aircraft enclosed in the barrier in bag-like fashion prior to actual deceleration load on the span of the arresting gear cable.

Figure 4 is a perspective view of one of the posts for supporting the automatic barrier erecting cable and lead-off connections to the valve for controlling operation of the automatic barrier erector mechanism.

Figure 5 is a perspective view of a barrier stanchion showing its pivotal mounting to one side of a landing surface, and an illustration of the several elements of the automatic erecting mechanism.

Figure 6 is a detail view of the means for forward angular positioning of the upper cross cable support of the barrier, to thereby caus esaid cable to fall rearwardly of the aircraft.

Figure 7 is a top plan view of the barrier prone on a deck or runway prior to erection with the various connections schematically illustrated, such as the span cable of the arresting gear and barrier pendant coupling to the center of the span.

Figure 8 is a detail in broken perspective of the barrier equalizer stringers showing their respective loop connections at each end around the barrier support cables.

Figure 9 is a detail in broken perspective of the load released stringer retainer cross webs and one form of load released fastener, which normally keep the stringer webs positioned until the barrier stringers tension around the aircraft; and Figure 10 is a perspective view of coupler between the barrier and the span cable of the arresting gear.

Referring to the drawings in detail and first with particular reference to Figures 1, 2 and 3, the novel barrier and its automatic operation by an aircraft is illustrated. For example, Figure 1 illustrates a landing surface 10 with an aircraft of a jet type 11 landing thereon and approaching a single automatic control cable or strand 12 supported by hollow uprights 13 mounted on base members 14 at each side of the surface 10. This strand 12 includes a frangible link 15, see Figure 4, and reeves over a pulley 16 mounted on an axle pin 17 between ears 18 formed from the upper end of the hollow upright 13 and leads downward through the bore of the upright or post around a pulley 20 mounted between lugs 21 on a transverse pin 22 between supports on base 14. Leading off from the pulley 21 the strand 12 connects with a lead or a cable 23, which is coupled to a valve lever 24, see Figure 5, of the automatic control mechanism for barrier erection. This mechanism will be described later in detail.

As the aircraft travels forward it engages the automatic control cable or strand 12, and as shown in Figure 2 the strand 12 is pulled or broken at links 15 and actuates the valve lever 24 to which it is coupled by lead 23. This permits fluid, such as air from the air bottle 26, see Figure 5, to flow through the valve 27 into conduit 28 back of a piston in cylinder 29, to thereby raise or erect the barrier 30 to the Figure 2 position. This piston has a piston rod 31, which extends outwardly of the cylinder 29 and is pivotally coupled by a coupling joint 32 to a link 33. This link in turn is pivotally coupled at the opposite end to a spur or projection 34 by a coupling 35 carried by the lower portion of the respective barrier stanchions 36 and 37. Thus when the stanchions are prone or flat on the landing surface the retracting of the piston rod 31 imparts a pull through the link 33 to its respective stanchion, to thereby erect the same with the connected barrier.

As the barrier 30 is erected a tension means on each side of the barrier, such as a cable 38 coupled by a shear link 38' to each side of the barrier respectively is reeved around a respective spring take-up drum 39. These drums 39 are anchored to the landing surface 10 to each side of the same at respective locations 40, see Figures 2 and 6. By having the respective tension cables 38 connected to each side of the barrier 30 below the center point of each respective side thereof, this causes the barrier to be angled forward; that is, toward the approach side of the landing surface and the nose of an incoming aircraft to be arrested, whereby the upper marginal cable 41 thereof, connected at each end by a respective breakable link 43, will as hereinafter explained fall forward toward the surface 10 on the approach side of the barrier 30 and over the rear of an aircraft engaging the barrier and thus completely bag the aircraft, as illustrated in Figure 3, when the respective links 43 are parted.

When the aircraft is bagged as in Figure 3, the barrier load members, that is, the vertical stringers 44 of the erected barrier will equalize themselves to the form of the aircraft in response to the deceleration load against the aircraft. If desired the horizontal members 45 may be detachable from the vertical stringers 44 at the separable fastener 46 by the pull or load thereon when the aircraft engages the members. This fastener may be of any suitable type, such for example, as a snap fastener 46, and are primarily to facilitate repair and overhaul of the barrier.

Barrier construction

The present novel barrier 30 comprises the vertical stringers 44, which may be nylon webbing of suitable width and thickness. Each stringer 44 is looped around the upper and lower longitudinal marginal supporting cables 41 and 41' in a manner to permit sliding movement on these cables. To provide freedom of movement on each respective cable the interior of each loop has a metal liner, such as a steel insert 48 or the like to prevent damage to the nylon stringers when moving along the cable to assume an equalized position during the slack take-up. During slack take-up the vertical load stringers 44 are held in spaced apart position by the intermediate horizontal nylon webs 45 connected to the load stringer or webs to be certain that the airplane, particularly the swept-wing type, does not slip through the vertical load-carrying stringers or webs before slack take-up and load is applied to the airplane.

The barrier 30 therefore comprises vertical load stringers prior to slack take-up and load and this unit is attached by cable 50 and shear links 43 coupled to the top marginal supporting cable 41 and to the upper free end of each barrier support or stanchion 36 and 37, while the lower part of the barrier is connected by a loop of cable 51 to a pendant 52, see Figures 7 and 10. This loop of cable 51 is a continuous part of the marginal cable 41', see Figure 7. However, if desired or found expedient under certain conditions it may be a separate loop from the lower marginal cable 41' and coupled by suitable means to each respective end of the cable 41' at each side of the barrier 30. This pendant 52 is permanently coupled by means 53 to the arresting gear cable 54, which spans across the landing surface 10. The arresting gear mechanism is not shown as it is the subject matter of a co-pending application Ser. No. 436,028, now U. S. Patent No. 2,789,780. However, it is important to note the fact that all slack of the nylon load webs or stringers 44 is taken up before the arresting gear starts to move, thereby taking full advantage of the span effect.

It is believed that the foregoing description has clearly and adequately described the automatic control mechanism for barrier erection and it is only necessary to release the air from the erecting cylinder 29 to set the mechanism. Briefly reviewing the operation, as the airplane 11 engages the barrier 30, the vertical stringers 44, which are the ultimate load-carrying members, contact the wings of the airplane. The vertical strings exert a load on the main top horizontal and lower horizontal cables 41, 41' which breaks the shear links 43 supporting the barrier to the barrier supports or stanchions 36 and 37. The vertical stringers are free to move along the cables 41 and 41'. Once the cable 41 is broken from the shear links 43, the only supporting point is the single attachment to the pendant 52 as shown in Figure 3. The vertical stringers 44 which have contacted the airplane therefore continue to pull out the slack in the cable and also to cluster at one point when all the slack in the system is taken up. When all slack is taken up, it is important to note that all the load-carrying members 44 are approximately the same distance from point of contact on the airplane to the point on the cable 41'. The vertical stringers will pull toward the wing root or center of the airplane which also will equalize the load in the nylon stringers 44. Any small differences in this distance will be taken up by the inherent flexibility of the nylon stringers. Up to this time, when all slack is taken out of the system, no decelerating load from the arresting gear or engine, not shown, has been exerted into the arrest. As the airplane moves forward, the arrest is made using full advantage of the span effect of the pendant 52 as shown in Figure 3. This therefore eliminates any instant peak loads in the system caused by slack and inefficient use of the span, which has caused many barrier systems and barricades to fail in the past.

For example, if the airplane is still within three feet of the runway at a location 600 feet from the barrier, it is assumed that a runway over-run will result. At this location, the passing airplane engages the actuator cable 12 which energizes the barrier stanchions and erects the barrier 30 in a position to receive the oncoming airplane 11. The airplane nosewheel and main wheel (or no wheels) pass over the lower barrier cables and the nose and wing engage the vertical nylon stringers 44 of the barrier and pull apart the fasteners 46. The vertical stringers are sloped forward at approximately 40° or at an angle to insure that the upper cable 41, when broken from the shear links 43 supporting the upper cable to the stanchions, will fall clear of the rearmost part of the airplane. As the airplane continues further, the slack in the upper and lower cables 41 and 41' is taken up. At the same time, the vertical stringers 44 which have contacted the airplane move forward along the cables until all slack is taken up. The airplane is then engaged by several of the vertical stringers pulling from a single point at an angle favorable to sweptback airplanes as well as straight wing aircraft. The load is transmitted to the fixed point of the arresting gear runway pendant 52. The remaining part of the operation is a normal arrest by any suitable arresting gear and should result in a deceleration curve very similar to an arrest made with a standard arresting hook.

When the airplane is brought to a stop, it is only necessary to remove one bolt 56 at the runway pendant 52 to remove the barrier 30 from the scene to be stored for future use after inspection and possible overhaul. While the airplane is being removed from the scene, a new barrier is placed in position and the arresting gear is reset for the next operation. The vertical stringers of the barrier are tied down to an anchor point to hold in position particularly under windy conditions.

Although only one embodiment of the invention has been illustrated and described in detail, and it is to be understood that various changes may be made in the design, arrangement and combination of the parts without departing from the scope of the invention. For a definition of the scope of the invention reference should be had to the appended claims.

What is claimed is:

1. A barrier unit formed of slack take-up equalizing resilient barrier members arranged in spaced relation to each other, upper and lower marginal supporting means for the said members, a coupling device carried by the said lower marginal supporting means, said members being looped at each end around a respective marginal supporting means in a manner permitting sliding movement along each of the marginal supporting means, a pair of spaced apart stanchions, frangible connections each connected respectively to said upper marginal supporting means and to one of said stanchions, and tension means connected to said unit below the center point of each side thereof, each tension means including a cable, a fixed tensioning drum, and a shear link, said cable being reeved around said drum, each of said links being connected at its free end to a respective end of said tension means cable, whereby said unit is slanted from an intermediate off-center apex of the unit rearwardly of the said upper marginal supporting means.

2. For use with suitable arresting means including a span cable transverse a landing deck and having a pendant secured thereto, a barrier formed of spaced vertical load carrying stringers, said stringers being slidably supported at each end on marginal upper and lower cables, a landing deck below the barrier, said upper cable being detachably supported between spaced barrier stanchions and said lower cable being secured at one point to said deck pendant, spaced horizontal stringers detachably fastened to each of said first stringers, said stanchions being pivotally supported on base members to permit the barrier to spread out level on the landing deck in a prone position, and automatic control mechanism adapted to erect said stanchions and said barrier to a vertical position with respect to the landing deck.

3. An aircraft barrier formed of cross connected vertical and horizontal nylon webs to form a net structure, said vertical and horizontal webs being disconnectible from each other, said vertical webs being slidably looped at their respective opposite ends to spaced apart upper and lower marginal horizontal cables, coupling means at each end of the upper marginal cable secured to spaced apart stanchions and the lower marginal cable being secured at a single substantially centered point to a deck pendant which in turn is secured to an arresting gear cable, whereby upon slack take-up of said vertical webs during an arrest said looped ends are drawn to a single central point and said horizontal webs disconnected from the said vertical webs at their respective cross connections.

4. The barrier described in claim 2, wherein the automatic control mechanism comprises a control strand across the landing deck on the approach side of the barrier, said strand being supported by upright members on each side of the deck, a valve connected to said strand adapted to be opened when said strand is parted or pulled, a fluid reservoir connected through said valve by conduits to a cylinder having a piston therein, and a piston rod connected to each respective stanchion adapted to raise said stanchion to a vertical position when fluid flows into the cylinder to move said piston.

5. An aircraft barrier comprising a net-like structure formed of vertical load carrying webs of shock absorbing material and upper and lower horizontally spaced marginal support cables, each of said webs being slidably connected at each of their respective opposite ends between the respective marginal support cables, horizontally spaced apart web position retaining means between said upper and lower support cables extending across and contiguous to medial portions of each of said vertical webs, detachable connections coupling said respective retaining means at each contiguous medial crossing point to said respective webs, and a center member, connected to said lower support cable.

6. The aircraft barrier described in claim 5, wherein the slidable connection of the web ends comprises a loop on each end of the web with a metal liner.

7. As an article of manufacture, a barrier for a mobile object comprising a pair of spaced marginal cables, arresting cable coupling means carried by one of said marginal cables, a plurality of spaced flexible stringers disposed between said pair of cables in transverse relation thereto, and the opposite respective ends of said stringers being looped around each of said cables for free sliding movement lengthwise thereof.

8. As an article of manufacture, a barrier for a mobile object comprising spaced apart marginal cables, a coupling device carried by one of said marginal cables, stringers connected at each respective end to the cables, said stringers being slidably connected at their respective opposite ends between the respective spaced apart marginal cables to thereby be free to move on the cables, means extending transverse said stringers detachably connected to and across each stringer for holding same in position, and separable fastener elements connecting said stringers and said transverse means releasably by movement of said stringers when engaged by a mobile object.

References Cited in the file of this patent

UNITED STATES PATENTS

| | | |
|---|---|---|
| 1,315,320 | Mesurier | Sept. 9, 1919 |
| 1,789,653 | Hoyt | Jan. 20, 1931 |
| 2,005,418 | Gleason et al. | June 18, 1935 |
| 2,440,574 | Cotton | Apr. 27, 1948 |
| 2,474,858 | Nicholson | July 5, 1949 |
| 2,482,693 | Rogers et al. | Sept. 20, 1949 |
| 2,488,050 | Brodie | Nov. 15, 1949 |
| 2,675,197 | Hospers | Apr. 13, 1954 |